(12) United States Patent
Ananthanarayanan

(10) Patent No.: US 6,414,265 B1
(45) Date of Patent: Jul. 2, 2002

(54) METHOD AND APPARATUS FOR DRAWN ARC WELDING WITH MAGNETICALLY IMPELLED ARC

(75) Inventor: Venkatasubramanian Ananthanarayanan, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/634,071

(22) Filed: Aug. 8, 2000

(51) Int. Cl.[7] .................................. B23K 9/08
(52) U.S. Cl. ..................... 219/123; 219/60 R
(58) Field of Search ................ 219/123, 100, 219/60 A, 61, 60 R

(56) References Cited

U.S. PATENT DOCUMENTS

| | | | |
|---|---|---|---|
| 2,477,582 A | * 8/1949 | Dawson | 219/100 |
| 3,287,539 A | * 11/1966 | Stevens | 219/123 |
| 3,937,916 A | * 2/1976 | Sciaky | 219/123 |
| 4,214,144 A | 7/1980 | Spiegelberg | |
| 4,219,722 A | * 8/1980 | Rudd et al. | 219/123 |
| 4,246,464 A | * 1/1981 | Altstetter et al. | 219/123 |
| 4,273,986 A | * 6/1981 | Edson et al. | 219/123 |
| 4,443,686 A | * 4/1984 | Pache et al. | 219/123 |
| 4,511,784 A | * 4/1985 | Miyamori et al. | 219/123 |
| 4,531,042 A | 7/1985 | Shoup et al. | |
| 5,587,093 A | 12/1996 | Aston | |
| 6,211,489 B1 | * 4/2001 | Kuchuk-Yatsenko et al. | 219/123 |

* cited by examiner

*Primary Examiner*—Clifford C. Shaw
(74) *Attorney, Agent, or Firm*—Robert M. Sigler

(57) ABSTRACT

A method and apparatus for drawn arc welding includes the step of applying a magnetic field transversely to the arc to impel the arc along the welding gap. The invention permits tubular components to be welded using drawn arc welding, but is useful in welding nuts and other components having a continuous outer surface. The field may be varied to impel the arc between the inner and outer diameters of a tubular member being welded.

2 Claims, 3 Drawing Sheets

METHOD AND APPARATUS FOR DRAWN ARC WELDING WITH MAGNETICALLY IMPELLED ARC

TECHNICAL FIELD

This invention relates to a method and apparatus for joining components by drawn arc welding.

BACKGROUND OF THE INVENTION

Drawn arc welding is widely used to join components in many industries, including the manufacture of automotive vehicles, components of automotive vehicles, and appliances, and is also used in the construction of ships. In drawn arc welding, the components to be welded are brought into contact with one another and each component is connected to the welding voltage supply so that a current is drawn through the components. One of the components is lifted away from the other component to define a gap (the size of the gap is typically of the order of millimeters or a fraction of a millimeter) while maintaining the current through the components. Accordingly, an arc is drawn through the gap and extends between the components, melting or softening a portion of them. The current is then turned off, and the components are allowed to move back into contact, where they are welded together by the molten metal. The parts may be pressed together to improve weld quality. Drawn arc welding requires relatively simple or "lean" equipment as compared to other welding processes.

However, drawn arc welding has heretofore been limited to welding relative small studs (typically 0.25 in. or less in diameter) and similar sized brackets. The welding of tubular brackets and large studs has not been possible, because it was not possible using prior art drawn arc welding techniques to assure a consistent weld around tubular members and large studs. In many applications, a consistent weld is critical, because welds that have voids or gaps are not sufficiently strong.

SUMMARY OF THE INVENTION

According to the present invention, a magnetic field is generated by energizing electromagnetic coils to generate a magnetic field acting through said gap transversely with respect to the arc. Accordingly a resultant force is generated (as determined by the three finger rule well known to those skilled in the art) which impels the magnetic force along the gap. In the case of tubular brackets, the arc is impelled circumferentially around the bracket, so a consistent weld may be obtained around the circumference of the bracket. The field may be varied by known techniques, such as using additional coils placed appropriately or by physically moving the coils, to drive the arc between the inner and outer diameters of the component. Because of the impelled arc, brackets and nuts may be welded using the drawn arc welding technique that are significantly larger than is possible using prior art techniques, and tubular brackets may be welded using drawn arc techniques than could not be welded by drawn arc welding techniques known in the prior art.

It is important that the magnetic field be generated substantially transverse to the arc. It has already been proposed, for example, in U.S. Pat. No. 4,531,042, to generate a magnetic field acting parallel to the arc. However, this field will only contain the arc, and will not impel the arc relative to the components being welded.

BRIEF DESCRIPTION OF THE DRAWINGS

FIG. 3 is a view similar to FIG. 1, but illustrating an alternate embodiment of the present invention;

FIG. 4 is a top plan view of FIG. 3:

DESCRIPTION OF THE PREFERRED EMBODIMENT

Figure 1:
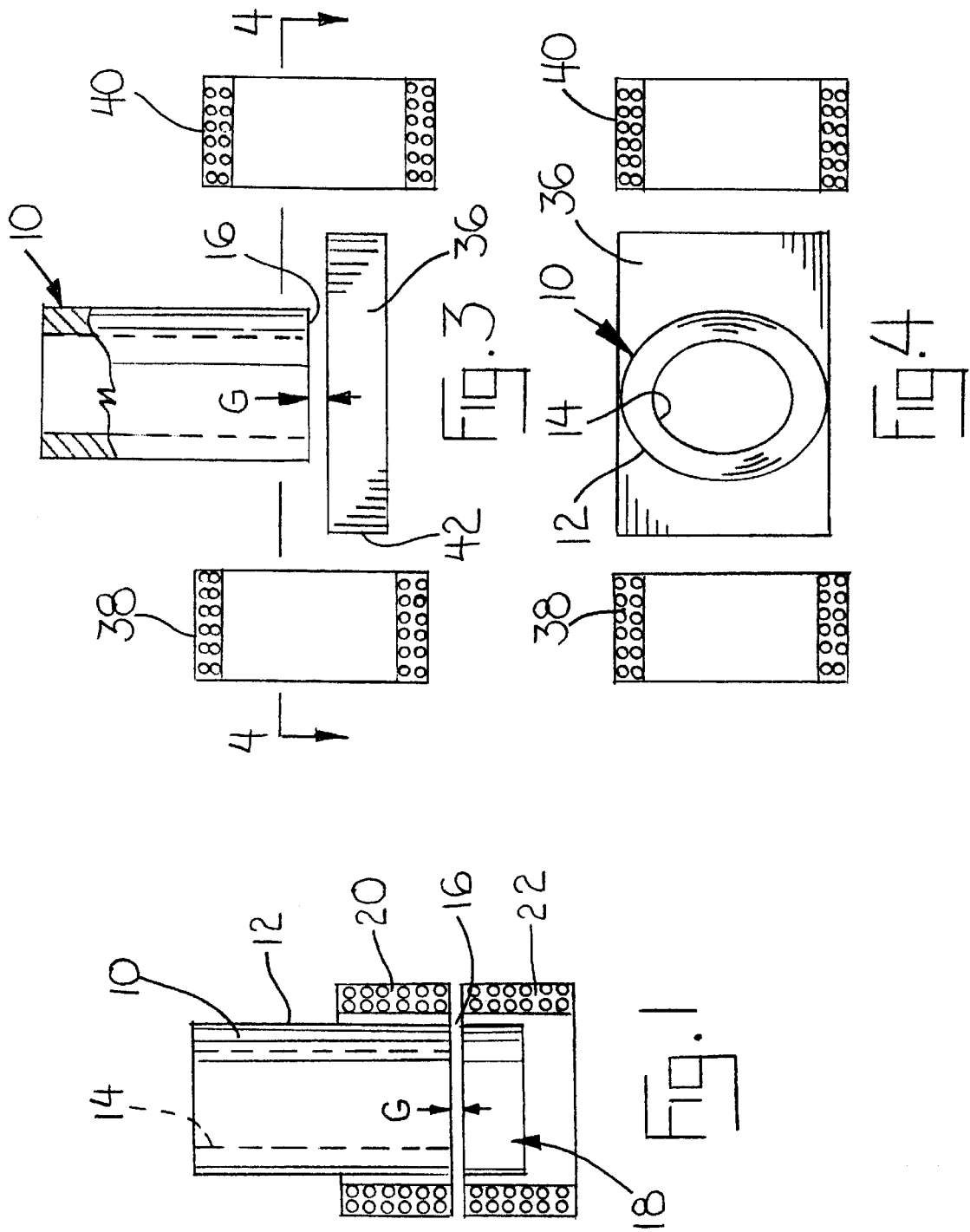
FIG. 1 is a side elevational view, partly in section, illustrating the manner in which electromagnetic coils are placed around the components to be welded.
Figure 2:
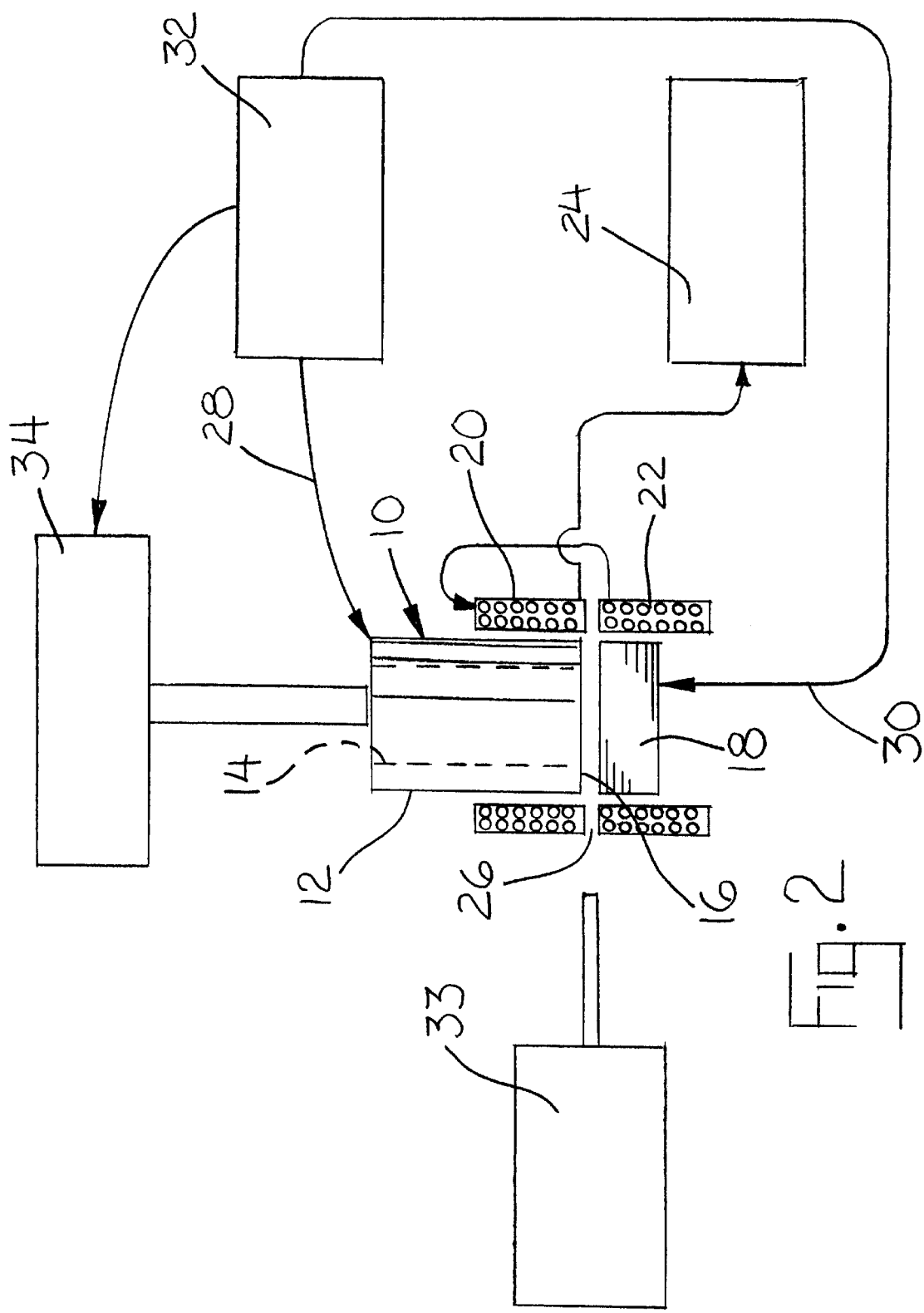
FIG. 2 is a schematic illustration of the welding equipment used to effect welding and to provide electrical energy to the coils used when components are welded according to the present invention.

Referring now to FIGS. 1 and 2 of the drawings, a tubular component or bracket generally indicated by the numeral 10 includes an outer circumferential surface 12, an inner circumferential surface 14, and a transversely extending end face 16 which connects the surfaces 12,14. The end face 16 of the bracket 10 is to be welded to a component 18, which in the case of FIG. 1 is a circular plate. According to the invention, an electromagnetic coil 20 is placed over the bracket 10 and a second electromagnetic coil 22 is placed around the component 18. Electrical current is supplied to the coils by a coil power supply 24. The contiguous ends of the coils 18, 20 are separated by a gap 26. The coils are connected in series, such that the direction of current flow in one of the coils 20 or 22 is opposite to that in the other coil. Accordingly, the coils 20, 22 generate fields of opposite polarity, so that the resultant magnetic field acts radially with respect to the tubular component 10.

Welding is effected by connecting welding electrodes 28, 30 of a conventional welding power supply 32 to the components 10 and 18 respectively. The welding electrodes 28, 30 are of opposite polarity, so that when the electrodes are energized, an electrical current will flow through the components 10 and 18 between the electrodes 28, 30. However, prior to energization of the electrodes, the component 10 is installed in a stepper or linear motor 34 which is adapted to move the component 10 a small distance along its axis to establish a welding gap G between the components 10 and 18. Instead of a stepper or linear motor, a solenoid and spring, and other similar devices may be used to move the component 10. The gap G may be very small, and normally will not be more than a few millimeters or even a fraction of a millimeter. The stepper motor 34 is also controlled by the welding power supply 32, which is set by the operator to establish a desired gap between the components and current level through the components according to procedures well known to those skilled in the art. If necessary, an inert shielding gas may be provided from mixer 33 in a manner well known to those skilled in the art.

When welding is to be effected, the component 10 is installed in the stepper motor 34 and the welding electrodes 28, 30 are fastened to the components 10 and 18. The components 10 and 18 are then brought into contact with one another and the electrodes are energized to draw an electrical current through the components 10 and 18. The stepper motor is then operated to withdraw the component 10 from the component 18 to establish the gap G and the coils 20, 22 are energized. Accordingly, an arc is drawn across the gap G. Coils 20,22 are then energized so that the resultant electromagnetic field impels the arc around the face 16. The arc is maintained for a predetermined time and is then extinguished by turning off the current from the power supply. The stepper motor 34 is then operated to allow the component 10 to move into contact with the component 18.

Because of the impelling of the arc around the face 16, a substantially uniform weld is achieved around the component 10. Although the invention has been particularly described with respect to a tubular component, other components, such as nuts, may also be welded using the invention. It is necessary only that the component to be welded have a continuous surface to maintain continuity of the arc as it is being impelled. Additional coils may be provided which are offset radially from the gap G to vary the electromagnetic field so that the arc may be moved radially as well as circumferentially.

Referring now to the embodiment of FIGS. 3 and 4, elements the same as those in the embodiment of FIGS. 1 and 2 retain the same reference numeral. In FIGS. 3 and 4, the bracket 10 is welded to a component 36 which is a flat plate. Coils 38, 40 are offset radially from the tubular component 10 and circumscribe at least a portion of the component 10 and the edge surface 42 of the component 36, and also circumscribes a sector of the gap G. The axes of the coils 38, 40 extend substantially parallel to the lower face 16 of the component 10, and the coils are connected in series. Upon energization of the coils, a resultant magnetic field is generated which acts radially with respect to the component 10 and parallel to the gap G, thereby impelling the arc circumferentially about the gap G during welding of the components. Although two coils 38, 40 are disclosed, three or more coils may be used and would produce a more uniform field. Welding is effected in substantially the same way as disclosed above with respect to FIGS. 1 and 2. The placement of the coils in the embodiment of FIGS. 3 and 4 permits welding to larger plates such as the plate 36 than is possible using the coil placement illustrated in FIGS. 1 and 2.

Figure 5:
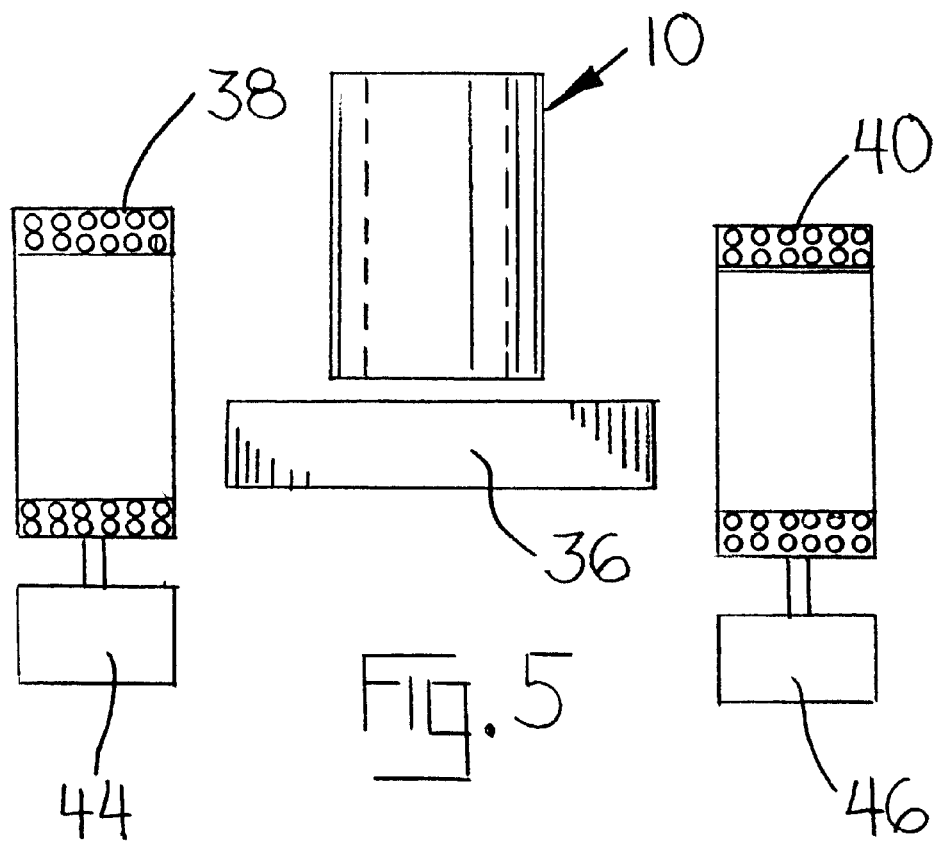
FIGS. 5 and 6 are views similar to FIGS. 3 and 4 respectively, but illustrating still another embodiment of the present invention.
Figure 6:
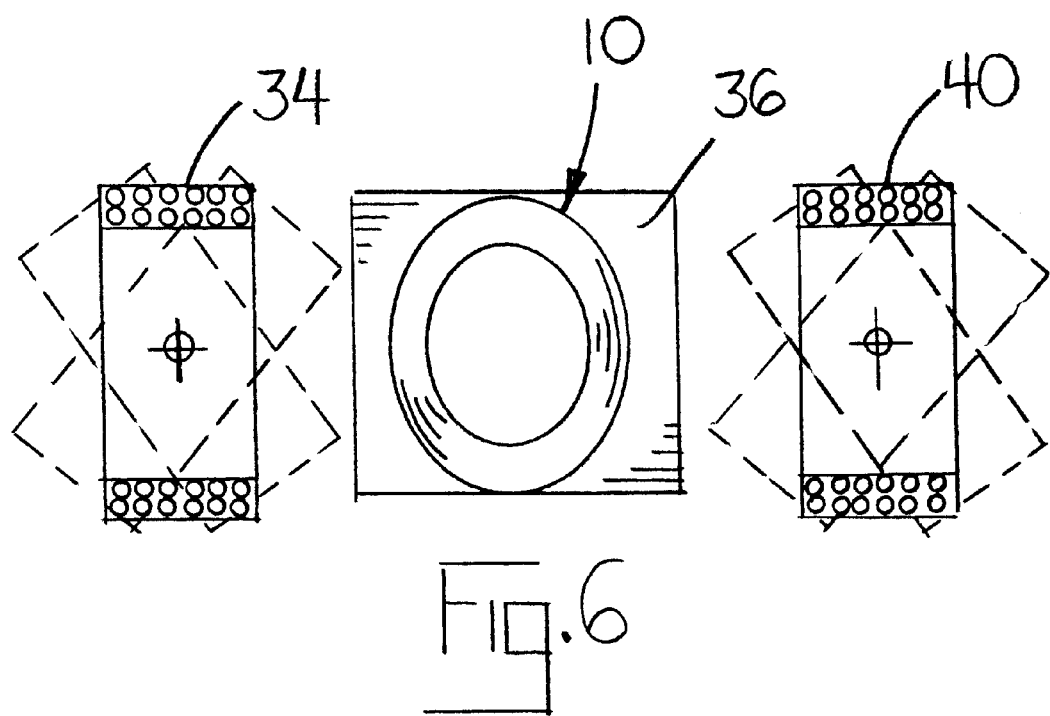

Referring now to the embodiment of FIGS. 5–6, elements the same as those in the embodiments of FIGS. 1–4 retain the same reference numeral. FIGS. 5 and 6 are similar to FIGS. 3 and 4, except that the coils 38,40 are mounted on actuators 44,46 which oscillate the actuators between the dotted line positions in FIG. 6. This movement of the coils 38, 40 varies the magnetic fields generated by the coils to impel the arc radially along the end face 16 between the outer surface 12 and the inner surface 14 as the arc is impelled circumferentially around the end face 16.

What is claimed is:

1. Welding apparatus for joining an axial end face of a tubular component to an adjacent parallel face of another component comprising a device for separating the adjacent parallel faces of the components from each other to define a gap therebetween and moving the adjacent parallel faces of the components together to join the components, a welding power supply having a first electrode for connection to the tubular component and a second electrode of opposite polarity from the first electrode for connection to the other component for causing an electrical current to flow through the components and an electrical arc to be drawn across the gap, a pair of magnetic coils located near the gap but not surrounding the tubular component or the other component, each of the magnetic coils being oriented to cause a magnetic field to extend through the gap parallel to the axial end face of the tubular component and the parallel end face of the other component when the coil is energized to thereby impel the electrical arc drawn through the gap circumferentially around the gap, and means for controllably rotating the coils while maintaining the magnetic fields thereof in the gap parallel to the axial end face of the tubular component and the parallel end face of the other component so as to move the electrical arc radially in the gap in a controlled manner.

2. Welding apparatus as in claim 1 wherein at least one of the coils has an axis directed through the gap parallel to the adjacent parallel faces of the components and is rotatable through a rotation arc in a plane extending through the gap parallel to the adjacent parallel faces.

* * * * *